F. CONRAD & P. MacGAHAN.
RECORDING MEASURING INSTRUMENT.
APPLICATION FILED MAR. 23, 1906. RENEWED JAN. 8, 1912.

1,031,042.

Patented July 2, 1912.

3 SHEETS—SHEET 1.

UNITED STATES PATENT OFFICE.

FRANK CONRAD, OF SWISSVALE, AND PAUL MacGAHAN, OF WILKINSBURG, PENNSYLVANIA, ASSIGNORS TO WESTINGHOUSE ELECTRIC & MANUFACTURING COMPANY, A CORPORATION OF PENNSYLVANIA.

RECORDING MEASURING INSTRUMENT.

1,031,042.     Specification of Letters Patent.     Patented July 2, 1912.

Application filed March 23, 1906, Serial No. 307,739. Renewed January 8, 1912. Serial No. 670,129.

*To all whom it may concern:*

Be it known that we, FRANK CONRAD and PAUL MACGAHAN, citizens of the United States, and residents, respectively, of Swissvale and of Wilkinsburg, in the county of Allegheny and State of Pennsylvania, have invented a new and useful Improvement in Recording Measuring Instruments, of which the following is a specification.

Our invention relates to electrical measuring instruments and particularly to instruments that are adapted to record graphically the values of the forces measured thereby.

The object of our invention is to provide means whereby accurate graphic records may be made of the values of the forces measured by an instrument of the indicating type without impairing the sensitiveness of the instrument.

Figure 1:
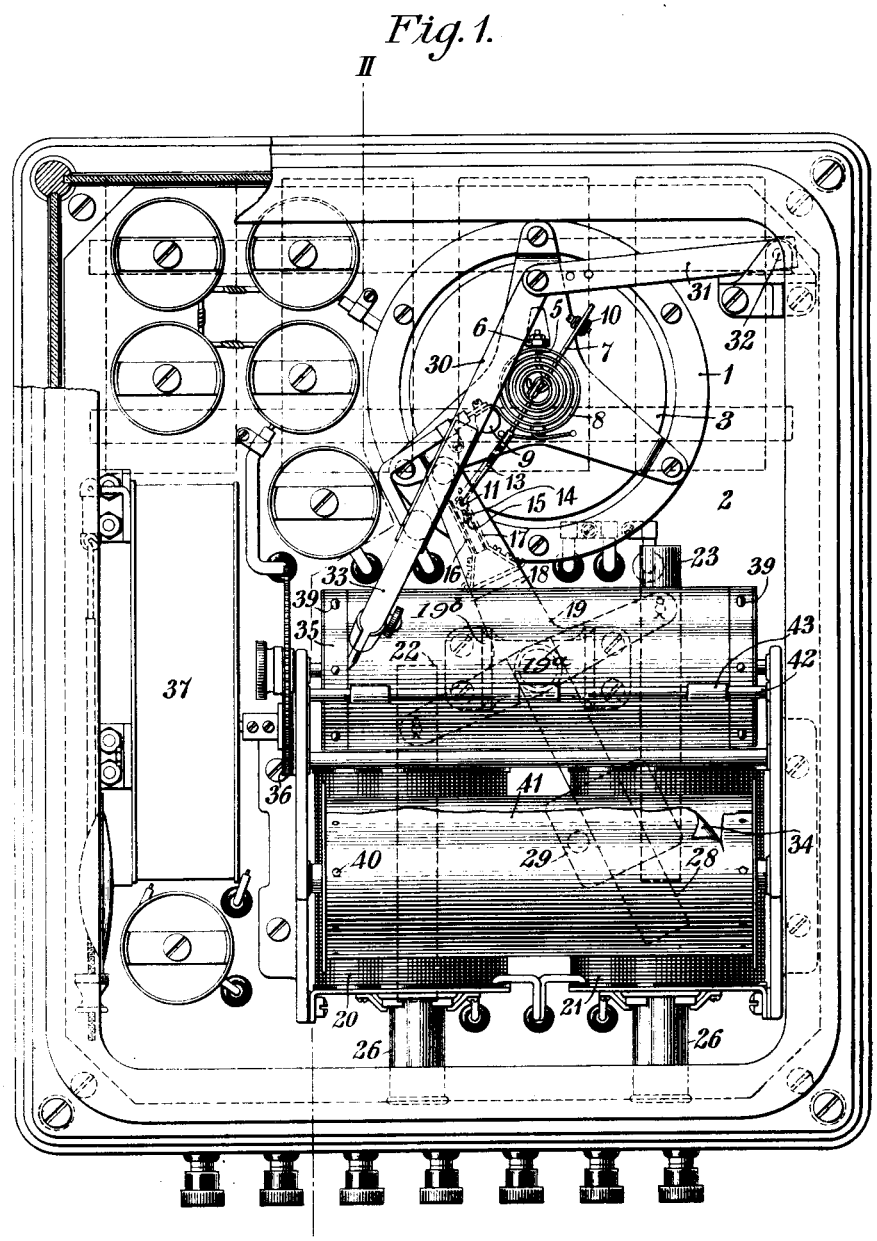
Figure 2:
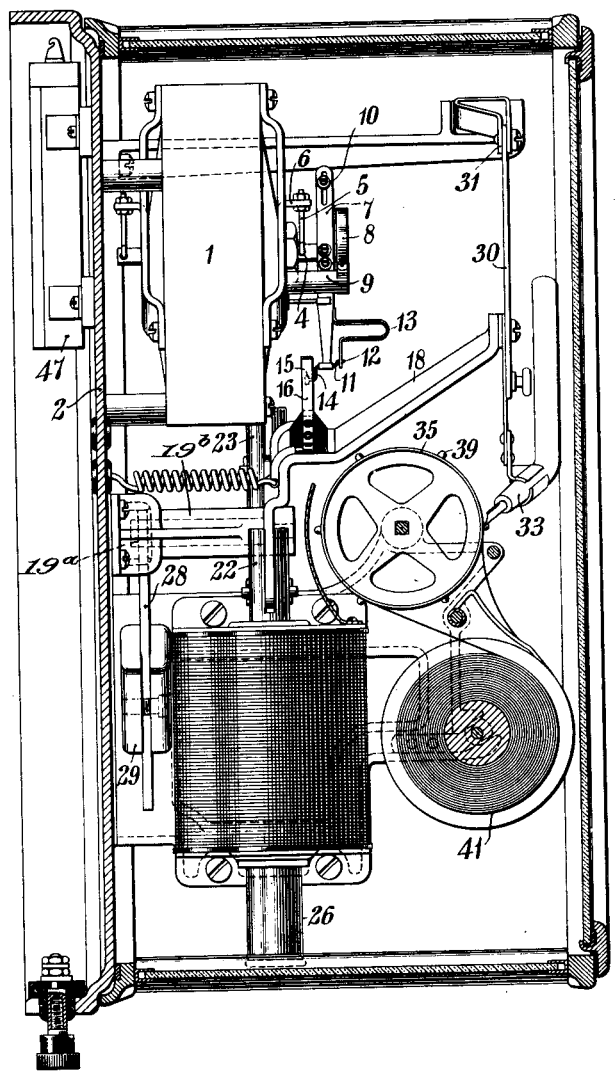
Figure 3:
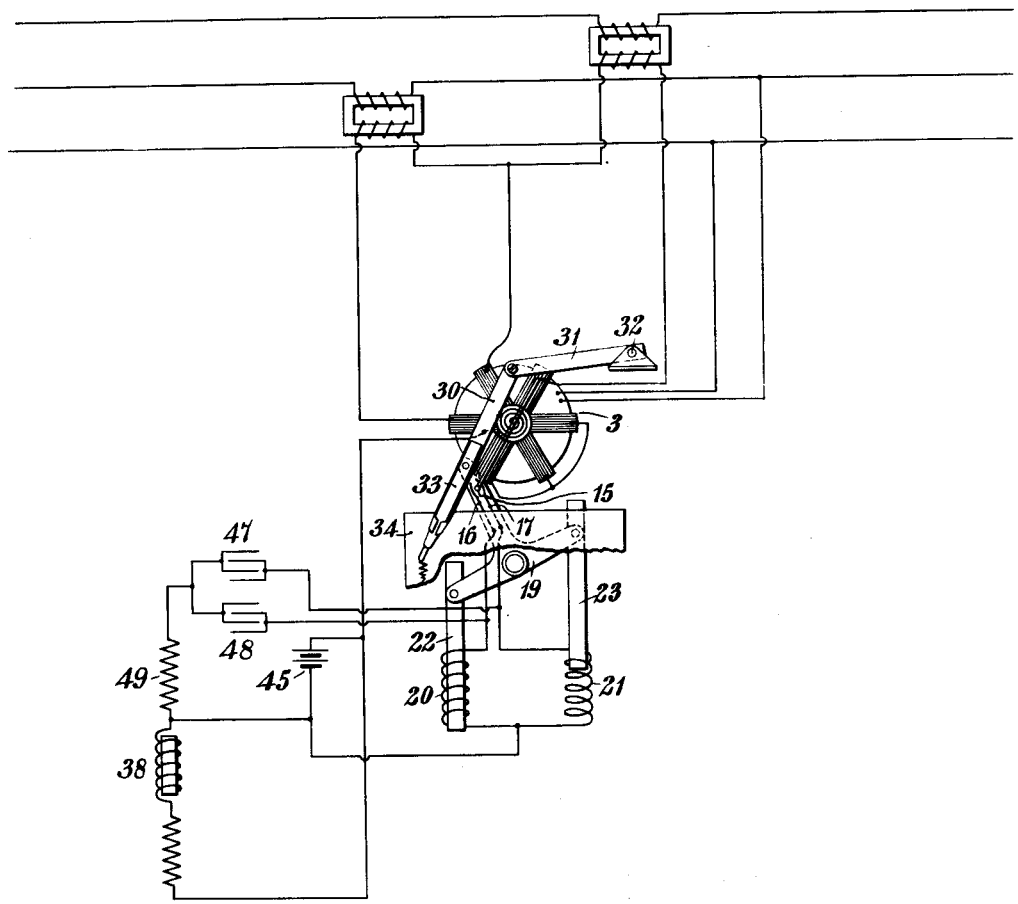

Figure 1 of the accompanying drawings is a view, in front elevation of an instrument constructed in accordance with our invention. Fig. 2 is a view, in side elevation and in section on the line II—II of Fig. 1 and Fig. 3 is a diagrammatic view of the circuit connections of the instrument.

An instrument to which our invention may be conveniently applied is a power factor or phase-indicating meter such as that which forms the subject-matter of Patent No. 695,913, granted to the Westinghouse Electric and Manufacturing Company, as assignee of Frank Conrad, and which comprises a member 1 that is immovably secured to a base or back plate 2 and a movable member 3 that is supported upon knife edged bearings 4 by means of hooks 5 that depend from stationary brackets 6. The movable member carries a switch arm 7 to which current is conducted by means of a spiral spring 8, one end of which is secured to a post 9, the upper end of the switch arm being slotted and provided with a weight 10 that may be adjusted in position in order to balance the movable parts, and a piece 11 in the form of a double crank being pivoted to the lower end. One of the crank arms 12 is shorter than the other and its outer end is pivotally attached to the free end of a substantially U-shaped spring 13, the other end of which is secured to the switch arm 7. The long crank arm 14 of the piece 11 is provided at its extremity with a contact piece 15, that is preferably composed of silver and is adapted to be moved into engagement with the one or the other of a pair of flexible contact terminals 16 and 17 that are preferably provided with platinum contact faces. It has been found that, when the engaging contact terminals are composed of different metals, such as those specified or others of similar character, sticking or welding together of the terminals may be substantially obviated. The contact terminals 16 and 17 are carried by an upwardly-extending arm 18 of a rocking beam 19, the shaft $19^a$ of which is supported by bracket arms $19^b$, and they are connected, respectively, to terminals of magnet windings 20 and 21, magnetizable cores 22 and 23 for which are carried, respectively, at the extremities of the rocking beam. The magnet windings 20 and 21 surround non-magnetizable receptacles 26 in which the magnetizable cores are adapted to operate, the receptacles being filled with oil or other suitable liquid for the purpose of retarding the movements of the rocking beam. The rocking beam 19 is also provided with a downwardly-extending arm 28 that carries a weight 29, which tends to return the arm to and hold it in a vertical position and which is adjustable in position thereon for the purpose of balancing the movable parts of the mechanism.

The upper extremity of the arm 18 is pivoted at or near the middle of a lever 30, the upper end of which is pivoted to one end of a lever 31, the other end of the lever 31 being pivoted at 32. The lever 30 serves to move a fountain pen 33 or other marking device, that is secured to its lower end, over a record strip 34 carried by a platen roll 35. The dimensions and arrangements of the levers just described are such that when the rocking beam is operated by means of the magnet windings 20 and 21, the point of the fountain pen will be moved in a straight line across the face of the platen roll 35. The platen roll 35 is adapted to be operated, through intermediate gearing 36, by means of a clock work (not shown) that is supported in a frame 37, the clock being preferably of the self-winding type and a magnet winding 38 being provided for effecting winding thereof. Since the structural details of the clock form no part of our present invention and since many forms of such clocks are known in the art, we deem it unnecessary to further show or describe the structural details and the mode of operation thereof. The ends of the platen roll are provided with projections 39 that are adapted to register with corresponding apertures 40 in the edges of the record strip, the strip being thereby drawn from a supply roll 41. The record strip is pressed tightly against the platen roll by means of a small idle roll or spindle 42, having a plurality of rubber or other resilient sleeves 43.

In operation, the member 3 of the instrument is moved by the forces exerted between it and the stationary member 1 and, if the switch arm 7 is moved from the position shown toward the right, its contact piece 15 will be caused to engage the contact terminal 17 and the circuit of the magnet winding 21 will be thereby established. As here shown, the auxiliary circuits of the instrument are supplied from a battery 45, though, if desired, they may be supplied from any other suitable source such as directly from the distributing circuits or from the circuits of the exciters for the field magnet windings of generators in connection with which the instrument may be employed. Upon energizing of the magnet winding 21, the core 23 is drawn downwardly and the arm 18 of the rocking beam will follow the movement of the switch arm 7 to the right until the contact terminal 17 and the terminal piece 15 at the extremity of the switch arm 7 become disengaged. Upon the movement of the switch arm farther to the right the contact piece 15 may be again brought into engagement with the contact terminal 17 and the arm 18 will also be moved farther to the right. It will be understood, of course, that the movements of the pen 33 correspond to those of the beam 19 and that a record of the variations of the forces will be made upon the strip 34. Upon a movement of the switch arm 7 to the left, the terminal piece 15 will be moved into engagement with the contact terminal 16, whereupon the circuit of magnet winding 20 will be established. The arm 18 if the rocking beam will then be moved to the left until the engaging contact terminals become disengaged. As the record strip is moved a certain amount for each hour or other interval of time, it may be ruled and spaced so that the record will present the variations in the values of the forces measured during that period and the value of the force exerted between the stationary and movable members at any moment during the period.

In order to prevent or reduce sparking caused by the inductive discharges of the windings 20 and 21 when the circuits thereof are interrupted, condensers 47 and 48 are so arranged in circuit with a resistance 49 that each of the windings 20 and 21 will be shunted by a condenser and the resistance, and upon interruption of the circuits of the magnet windings the discharge will occur through the condensers and the resistance, the condensers being preferably secured to the back of the plate 2. The structure at the extremity of the switch arm 7, comprising the double crank 11 and the spring 13, serves as a cushion between the engaging movable contact terminals and prevents injury thereto that might be caused by sudden movements. Other suitable means may be devised and employed which will insure resilient or yielding engagement between the contact terminals, such structures serving also to prevent vibrating engagement of the parts when the instrument is employed in connection with alternating current circuits.

While the invention has been shown and described as applied to a power factor meter, it may be applied to other instruments that indicate the values of the forces measured; that is, to those in which the extent of movement of the movable member is proportional to the force measured.

In another application, Serial No. 307,738, filed of even date herewith, means for recording the values of the forces measured have been set forth in connection with an instrument of the dynamometer type, and broad claims have been made therein which cover also the structure here shown and described.

Many of the details of construction and arrangement of the parts may obviously be varied within considerable limits without altering the mode of operation of the instrument to any substantial degree and without departing from the spirit of the invention.

We claim as our invention:

1. A measuring instrument comprising a stationary member, a movable member, the extent of movement of which is dependent upon the forces exerted between it and the stationary member, a recording mechanism, solenoids for actuating the same, and coöperating means carried, respectively, by the movable member and the recording mechanism for governing the circuits thereof.

2. A measuring instrument comprising a movable member, a recording mechanism, solenoids for actuating the same and coöperating means carried, respectively, by the movable member and the recording mechanism for governing the circuits thereof.

3. A measuring instrument comprising a movable member, a parallel-motion recording mechanism, solenoids for actuating the same and coöperating means carried, respectively, by the movable member and the recording mechanism for governing the circuits thereof.

4. A measuring instrument comprising a movable member, a switch member carried thereby, a recording mechanism, solenoids for actuating the same, and contact terminals carried by the recording mechanism that coöperate with the switch member to control the circuits of the magnet winding.

5. In a measuring instrument, the combination with a stationary member and a movable member, of a pair of solenoids, a pivotally supported beam connected to the solenoid cores and having contact devices to which the solenoid terminals are connected, a coöperating contact device carried by said movable member and two pivotally connected levers one of which is pivotally attached to the beam and is provided with a marking device.

6. In a measuring instrument, the combination with main stationary and movable members, of a pair of solenoids, a pivotally supported beam to which the solenoid cores are pivotally connected and having contact pieces to which the solenoid terminals are connected, pivotally connected levers one of which is provided with a marking device and is pivotally attached to one end of the beam, and a spring-supported contact device to coöperate with the contact pieces on the beam for making and breaking the solenoid circuits.

7. An instrument comprising measuring mechanism, recording mechanism, a switch member actuated by one of the said mechanisms, contact terminals actuated by the other mechanism, and coöperating with the switch member, and solenoids for actuating the recording mechanism the circuits of which are governed by the switch member and the coöperating contact terminals.

8. An instrument comprising measuring mechanism, a system of links and levers constituting parallel motion recording mechanism, solenoids for actuating the same, and separate coöperating means actuated, respectively, by the measuring and the recording mechanisms for governing the circuits thereof.

9. An instrument comprising measuring mechanism, a system of links and levers constituting parallel motion recording mechanism, solenoids for actuating the same, separate coöperating means actuated, respectively, by the measuring and the recording mechanisms for governing the circuits thereof, and means for retarding movements of the recording mechanism.

In testimony whereof, we have hereunto subscribed our names this 22nd day of March, 1906.

FRANK CONRAD.
PAUL MacGAHAN.

Witnesses:
OTTO S. SCHAIRER,
BIRNEY HINES.